Dec. 9, 1958 D. F. ALTIMIER ET AL 2,863,757
PROCESS FOR THE REMOVAL OF CALCIUM FROM SODIUM
Filed Dec. 3, 1956 2 Sheets-Sheet 1

INVENTOR.
DAVID F. ALTIMIER
CHARLES H. LEMKE
BY
AGENT

Dec. 9, 1958  D. F. ALTIMIER ET AL  2,863,757
PROCESS FOR THE REMOVAL OF CALCIUM FROM SODIUM
Filed Dec. 3, 1956  2 Sheets-Sheet 2

INVENTOR.
DAVID F. ALTIMIER
CHARLES H. LEMKE
BY
AGENT

2,863,757
PROCESS FOR THE REMOVAL OF CALCIUM FROM SODIUM

David F. Altimier and Charles H. Lemke, Niagara Falls, N. Y., assignors to E. I. du Pont de Nemours and Company, Wilmington, Del., a corporation of Delaware Application December 3, 1956, Serial No. 625,645

5 Claims. (Cl. 75—66)

This invention relates to the purification of sodium and is specifically directed to the removal of calcium from sodium.

For several important large scale uses of sodium such as the manufacture of tetraethyl lead, as a coolant in atomic reactors and in the manufacture of zirconium it is important that sodium be free from certain contaminants, among which calcium is particularly objectionable. For some uses specifications require sodium having as little as or even less than 25 parts per million of calcium.

Sodium is almost exclusively produced by the electrolysis of a fused salt mixture containing sodium chloride and calcium chloride. The sodium produced in the cell contains calcium which is in large part removed by filtering or settling but after separation at about 115° C. there is always left in the sodium up to 400 parts per million of calcium. This remaining calcium cannot be efficiently separated from the sodium by filtering or settling. Distillation would be effective but is too costly.

Among proposals for removing calcium from sodium is the use of oxidizing agents. Thus, Gilbert, U. S. P. 2,054,316, proposed that the calcium in the sodium be oxidized at temperatures above about 350° C. and the calcium oxide thus formed be removed by filtration. Indeed it was heretofore assumed, as Gilbert stated, that little or no oxidation occurs at temperatures below about 350° C. Methods such as Gilbert's were not adopted commercially because at the relatively high operating temperatures which seemed necessary there is excessive corrosion of apparatus, excessive amounts of sodium are lost and in addition to the oxidizing conditions encountered there is the inevitable accompaniment of dangerous run-away reactions to say nothing of the costs involved in high temperature operation of the process. It is inherently more dangerous to handle sodium at these high temperatures and any sodium leakage leads to fires which, if the sodium is initially at a high temperature are difficult if not impossible to put out.

It is therefore an object of the present invention to provide for the removal of small amounts of calcium from sodium by an improved process. It is also an object to agglomerate the residual calcium in such a way that the sodium can be separated from the calcium by simple physical means such as filtering or settling. Another object is to provide for the removal of calcium from sodium by controlled and selective exposure to oxidation at temperatures below about 300° C.

It has now been discovered that these and other objectives can be achieved by dispersing in molten sodium at temperatures below about 300° C. a gas mixture comprising upwards of about 98% by volume of an inert gas such as nitrogen and a gaseous oxidizing agent such as oxygen to the extent of 2% or less by volume, and continuing to disperse such gas mixture, preferably by recirculation through said sodium until the calcium contained therein becomes readily removable by physical means such as by gravity settling or by filtration to a calcium content below about 25 parts per million.

It is not certain whether calcium is dissolved or merely finely dispersed in the sodium. It is known that the calcium present in sodium from the electrolysis of fused salts is not separable therefrom by commercially feasible physical methods such as filtration or even settling for as long as 24 hours to low enough concentrations to be acceptable for the specific uses listed above. Distillation of sodium would, of course, produce calcium free sodium but the cost and the hazard preclude the use of this method as a practical matter. But whether dissolved or dispersed it has now been discovered that the calcium can be converted to a form that can be separated by filtration or by settling over relatively short periods of time, i. e., a matter of 24 hours or less, to a point where the recovered sodium will contain less than 25 p. p. m. and indeed the calcium content may go as low as 2 to 5 p. p. m. or be so low as not to be detectable by analytical means. This is accomplished by intimately contacting the sodium with an inert gas such as nitrogen, argon, helium, etc., containing an amount of oxygen not greater than 2% by volume and preferably less than 1%.

The necessary intimate contact between the gas and the sodium can be effected by various means. Bubbling or sparging the gas through the molten sodium is effective as is the use of a liquid gas agitator, say of the turbo-mixer type whereby the gas is entrained and thoroughly contacted with the liquid sodium. Other methods such as trickling the sodium down a packed column counter to the gas stream can also be effective. Other methods of intimately contacting the gas and the liquid sodium may also be used, such as a venturi or jet contactor in conjunction with a pipe line reactor. But whatever method of contacting is used it must be intimate and preferably quick and under favorable conditions the contacting time for a given quantity of sodium may be as short as 15 minutes or less and need not be longer than about one hour.

Operation of our process for purifying sodium with respect to the metallic calcium impurity is illustrated schematically. Two modes of operation are presented in the figures but the basic principles of our invention are not limited thereby.

Figure 1:
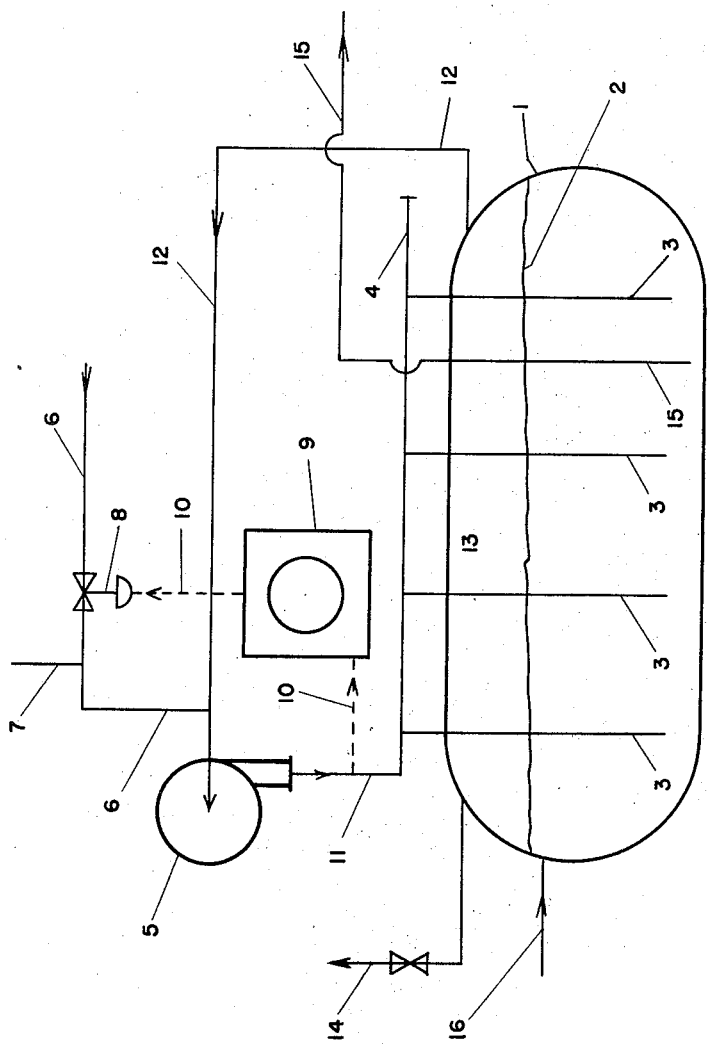
Figure 1 is a diagrammatic view of an arrangement for sparging sodium with a gas.

In Figure 1 a tank 1 contains sodium up to a level such as 2 and is heated above the melting point of sodium by means not shown. Gas or sparge pipes 3 carry the treating gas into the sodium and are conveniently arranged on a manifold 4 into which the gas is forced as by blower 5. Air or oxygen is admitted to the system at 6 from a source not shown through valve 8 which is controlled by an oxygen analyzer-controller 9 according to the concentration of oxygen as it exists in line 11 by way of 10. Inert gas, such as nitrogen enters the system at 7 from a source not shown. Sparged gas leaves the gas space 13 above the sodium line 2 by way of 12 and is recirculated to the sparge pipes 3 by pressure imposed by blower 5. The system can be vented as at 14 in such a way as to maintain a predetermined pressure in the system and to eliminate excess inert gas if, e. g., air is used as the source of oxygen at 6 and whereby excess nitrogen would build up in the system. Sparged or gas contacted sodium is withdrawn from tank 1 by pipe 15 into a filter or settling or other separating system by pump or vacuum means not shown. Fresh sodium to be sparged or contacted with gas is fed to the tank as at 16 from a source not shown.

The sodium sparging process as illustrated by Figure 1 is essentially a batch process. It could be adapted by ordinary engineering expedients to continuous or any desired batch-continuous operation.

Figure 2:
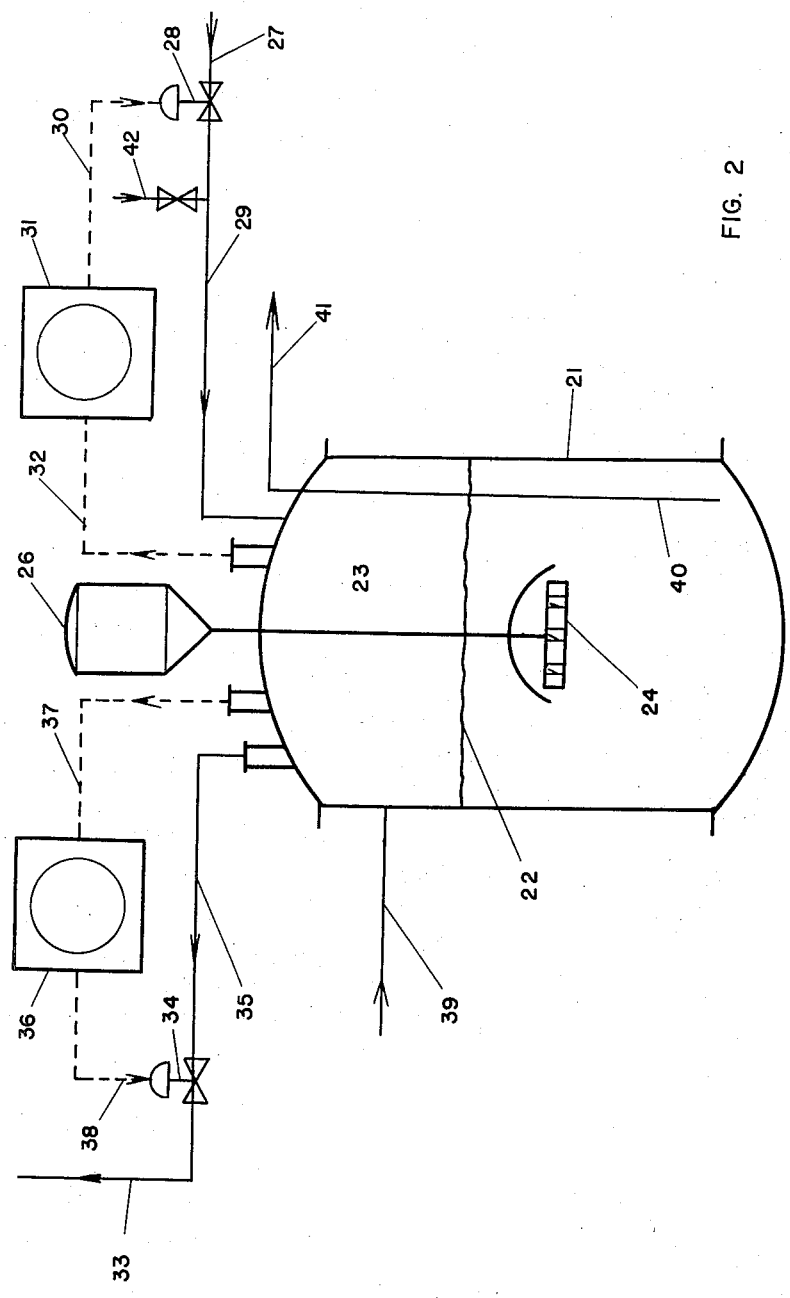
Figure 2 is a diagrammatic view of an arrangement for contacting sodium with a gas by means of a liquid-gas agitator of the turbo-mixer type.

In Figure 2 vessel 21 is the reactor partly filled with liquid sodium as at level 22 and the space 23 above the sodium is occupied by the contacting or treating gas. The sodium in the vessel is maintained at a desired temperature by means not shown. A turbo-mixer type of head represented by 24 and activated by motor 26 entrains the treating gas in space 23 and mixes it with the liquid sodium and thus establishes intimate contact between the gas and the liquid by the well-known principles of operation of the turbo-mixer. The treating or contact gas is maintained at the required composition consisting mainly of gas inert to sodium and in small part of oxygen by a system for the controlled admission of gases and a venting system. For example air or oxygen enters the reactor at 27 at a rate determined by the oxygen analyzer-controller 31 which by way of 32 makes contact with the nitrogen-oxygen gas phase 23 and in accordance therewith controls the entry of additional gas at 27 by means of automatically controlled valve 28 and line 29 by connection 30 according to known principles and mechanisms. When starting the treatment it may be advantageous first to fill the reactor and especially space 23 directly with nitrogen by way of inlet 42 and valve 43. As operation proceeds there is usually need to vent gases from the reactor to enable introduction of additional oxygen or air. The pressure recorder-controller 36 by contact 37 with the gas phase 23 in the reactor 21 is activated to regulate valve 34 by way of 38 and thus to vent gas by way of 35 and through 33 so as to maintain the desired pressure in the system. Sodium to be treated enters at 39 from a source and by means not shown. Treated sodium is withdrawn from the reactor by way of 40 and from 41 it may enter another reactor not shown or pass into the solid-liquid separating system also not shown, for removal of the insolubilized calcium. Depending upon the rate of production the sodium may be treated continuously in a single reactor or it may be treated batchwise. If a greater production rate is desired the sodium may pass through a series of reactors with intermediate or only final filtration, settling or other physical separation means of the insolubilized calcium.

The volume of disperser gas to the volume of sodium may be in a ratio of 20 to 1 to as much as 200 to 1, or even greater depending upon the efficiency of the contact established between the two. The gas may be used on a once-through basis but then large volumes would go to waste. It is more efficient and just as effective to recycle the same volume of inert gas repeatedly through and into intimate contact with the liquid sodium. However, if recycling of the carrier or contact gas is practiced it will in all probability be necessary to replenish the oxygen therein to maintain it at a desired concentration between about 2% but above 0%. A good practical concentration of oxygen in the carrier gas is between about 0.1 and 0.4% by volume.

Ordinary air, untreated, is the most economical source of inert gas and oxygen for the treatment of sodium to render the calcium insoluble and separable. If air is used, the vent gas from the system will constitute a source of very pure nitrogen with a relatively low oxygen content. Oxygen can, of course, be used to supply the oxygen in the treating gas for the present process but is no better than air except that the volume of vent gas will be very much smaller than if air is used.

It is not known what causes the calcium in the sodium to become removable by simple physical methods, such as filtration or settling, after the sodium has been intimately contacted with the gas mixture as described. It may be that highly dispersed, possibly dissolved, sodium oxide is formed and that this in turn causes the agglomeration of the calcium in some form and of a sufficient particle size so that filtration or settling will remove the calcium impurity. Apparently some calcium oxide is formed but it has been found that only a fraction of the calcium need be oxidized to render it physically separable and in that case part of the calcium remains on the filter or in the settled sludge as elemental calcium.

We have found that contacting absolutely inert gas such as 100% pure nitrogen or argon will not be effective in agglomerating the calcium by intimate contact with the sodium. We have also found that water vapor, hydrogen or ammonia mixed with the inert gas are also ineffective as additives to the gas mixture because they do not assist in rendering the calcium insoluble so that it may be removed by filtration, by settling or by other physical means such as by centrifugation. It appears that a small percentage of oxygen in the inert gas is necessary for the purposes of this purification of sodium.

It is preferable to treat the molten sodium at temperatures between about 100 and 250° C. At the lower temperature it is safer to treat large volumes of molten sodium because, if leakage or spillage were to occur, there would be less likelihood of fires which are difficult to control. Likewise, we have found that while the calcium agglomeration reaction proceeds more rapidly at higher than at lower temperatures the rate is sufficiently fast at the preferred range for practical purposes. Treating temperatures above about 300° C. are to be avoided both because the hazards increase rapidly and because the gain in speed of treatment with the higher temperatures is negligible.

Our invention is further illustrated by the examples which follow.

Samples of commercial sodium, about 180 grams, were cast directly into 1½ inch diameter schedule 40 stainless steel pipes, welded shut on the bottom. The tops of the tubes were closed with threaded pipe caps provided with suitable small diameter inlet and outlet pipes so that gas could be sparged through the molten sodium. The filled tubes were heated to about 110° C. and sparging with the treating gas was conducted at the rate and for the time indicated in the tabulation for Experiments 1 to 9. In each case the sodium, while molten and at about 105° C., was allowed to settle for about 24 hours before sampling the top layer.

*Table*

| Experiment Number | Composition of Sparge Gas | Rate of Sparge, ml./min. | Time of Sparge, min. | Calcium, Parts Per Million | |
|---|---|---|---|---|---|
| | | | | Before Treatment | After Treatment |
| 1 | Pure Argon | 100 | 60 | 226 | 234 |
| 2 | Pure Nitrogen | 71 | 60 | 153 | 157 |
| 3 | Argon + 1.4% $O_2$ | 71 | 60 | 130 | <5 |
| 4 | Nitrogen + 1.2% $O_2$ | 71 | 60 | 202 | 23 |
| 5 | Hydrogen | 100 | 180 | 306 | 196 |
| 6 | Argon + 1.7% $NH_3$ | 57 | 60 | 199 | 160 |
| 7 | Nitrogen + 1.2% $NH_3$ | 71 | 60 | 199 | 159 |
| 8 | Argon + 2.5% $H_2O$ | 59 | 60 | 208 | 170 |
| 9 | Nitrogen + 5.3% $H_2O$ | 75 | 60 | 217 | 160 |

EXAMPLE 10

A batch reactor was charged with 100 pounds of a commercial grade of sodium. A sample of this material without settling was analyzed and this indicated a content of 375 parts per million of calcium. Another sample was allowed to stand in an oil bath at about 105° C. for 24 hours and the settled product showed a content of 198 p. p. m. calcium. The charge in the reactor was pressurized at one pound per square inch gauge with nitrogen containing not over about 10 p. p. m. oxygen. No nitrogen flow into the reactor was permitted during the reaction. The nitrogen gas above the molten sodium was dispersed into the liquid by a turbo-mixer which is a type of agitator designed particularly for effective gas dispersion. The gas was continuously and rapidly dispersed as small bubbles into the sodium. The liquid sodium was maintained at 180° C. and the turbo-mixer operated for 1 hour. A one pound sample of sodium was then withdrawn and allowed to settle for 24 hours in an oil bath at 105° C. The calcium content of the settled sodium was found to be 189 p. p. m. indicating that substantially no calcium separation had taken place as a result of this treatment.

EXAMPLE 11

The procedure of Example 10 was repeated. A sample of unsettled sodium charged to the reactor showed a content of 314 p. p. m. calcium. Settling a sample of this sodium for 24 hours as described in Example 10 reduced the calcium content to only 260 p. p. m. The reactor was maintained at 180° C. and 3 cubic feet per minute of nitrogen gas at one p. s. i. g. was passed into the reactor. The gas contained 0.2% oxygen by volume. After ½ hour treatment a sample was removed and settled at 105° C. for 24 hours. This product showed a content of 124 p. p. m. calcium. After one hour of total mixing time with the molten sodium at 180° C. with the treating gas a second sample was withdrawn and after settling for 24 hours showed that the calcium content had been reduced to 19 p. p. m.

EXAMPLE 12

This example was conducted according to the method of the two preceding examples. The initial sample of unsettled sodium showed a content of 369 p. p. m. calcium. Settling for 24 hours at 105° C. reduced the calcium to 174 p. p. m. Treating the molten sodium at 230° C. with 3 cubic feet per minute of nitrogen containing 0.2% oxygen at one p. s. i. g. with a turbo mixer resulted in reducing the calcium content to 35 p. p. m. after ½ hour and to less than 5 p. p. m. after one hour. The calcium content was determined in samples which were allowed to stand at 105° C. for 24 hours as described above.

EXAMPLE 13

This treatment of a 100 pound sample of sodium followed the procedure of Example 12 except that the nitrogen was fed to the reactor at a sustained pressure of 15 p. s. i. g. The temperature was 230° C. and the nitrogen contained 0.2% oxygen. The initial charge of sodium contained 332 p. p. m. calcium which was reduced to 191 p. p. m. after settling for 24 hours. After the sodium had been treated with the gas for ½ hour a settled sample showed a content of less than 5 p. p. m. calcium. After one hour of treating time the calcium content after settling was also less than 5 p. p. m.

EXAMPLE 14

An experiment similar to Example 13 but with a treating gas pressure of 30 p. s. i. g. showed an equally low calcium content of less than 5 p. p. m.

EXAMPLE 15

The procedure of Example 13 was followed with a 100 pound charge of sodium in the reactor. The temperature was 230° C. and 3 cubic feet of nitrogen gas containing 0.4% oxygen was passed into the reactor which was pressurized at 30 p. s. i. g. The original charge of sodium contained 696 p. p. m. calcium which on settling at 105° C. for 24 hours dropped to 217 p. p. m. After ¼ hour of treating the calcium in a settled sample dropped to 17 p. p. m. After ½ hour of treatment the calcium dropped to 4 p. p. m. and after one hour only 3 p. p. m. of calcium could be found in the settled sample.

Concentrations of oxygen in the inert carrier or contact gas should not exceed about 2% by volume for the reason that excessive oxidation of sodium takes place. Further, higher concentrations lead to formation of insoluble masses of sodium oxide which have very little effect on the calcium and are therefore wasted insofar as the agglomeration of the calcium is concerned. Finally, larger concentrations of oxygen make it more difficult to achieve effective, quick and intimate contact between the gas and the sodium because the liquid becomes more difficult to manage physically as the sodium oxide content is increased.

The amount of calcium present in the sodium and to be removed is not an important factor. For practical reasons all the physically removable calcium, generally above about 400 p. p. m. will be removed in the ordinary procedure of manufacturing and filtering sodium. However, sodium containing up to 1000 p. p. m. of calcium has been successfully treated by the novel method here disclosed.

What we claim is:

1. In the process for removing calcium from sodium the steps comprising intimately mixing a gas mixture with molten sodium at a temperature below 300° C., said gas mixture comprising upwards of about 98% by volume of a gas inert to sodium at temperatures below 300° C. and less than about 2% by volume of oxygen, recirculating said gas mixture and replenishing the oxygen in said gas mixture to maintain the oxygen therein at a concentration below about 2% and above about 0.1% and continuing said recirculation until at least all the calcium above 25 p. p. m. of the sodium is separable therefrom by physical means.

2. The process of claim 1 wherein the gas inert to sodium is nitrogen.

3. The process of claim 1 wherein the gas inert to sodium comprises upwards of 99% by volume of nitrogen and the oxygen constitutes the balance of said gas mixture.

4. The process comprising intimately contacting molten sodium containing below about 1000 parts per million by weight of calcium at a temperature below about 250° C. with nitrogen containing between about 0.1 and about 0.5% by volume of oxygen for between about 15 and 60 minutes and then separating the calcium agglomeration product from the sodium.

5. In the process for reducing the calcium content of sodium contaminated therewith below 25 parts per million the steps comprising passing in intimate contact with liquid sodium below about 300° C. a gas mixture containing at least 98% but less than 100% by volume nitrogen and the balance oxygen, said gas mixture being recirculated through said sodium such that the volume of gas mixture intimately contacted with the sodium by passage therethrough is at least 20 times the volume of the sodium contacted and removing the agglomerated calcium products thus formed from the sodium.

References Cited in the file of this patent

UNITED STATES PATENTS

| 1,943,307 | Gilbert | Jan. 16, 1934 |
| 2,054,316 | Gilbert | Sept. 15, 1936 |
| 2,685,505 | Deyrup | Aug. 3, 1954 |
| 2,689,791 | Boag | Sept. 21, 1954 |
| 2,759,896 | Hawkes et al. | Aug. 21, 1956 |